US007161501B1

(12) United States Patent
Lynch et al.

(10) Patent No.: US 7,161,501 B1
(45) Date of Patent: Jan. 9, 2007

(54) HISTORICAL ANALYSIS OF AIRCRAFT FLIGHT PARAMETERS

(75) Inventors: Robert E. Lynch, San Carlos, CA (US); Robert E. Lawrence, Los Altos, CA (US); Thomas R. Chidester, Mountain View, CA (US); Brett G. Amidan, Kennewick, WA (US); Gary L. Prothero, Corvallis, OR (US); Timothy P. Romanowski, Corvallis, OR (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/066,650

(22) Filed: Feb. 22, 2005

Related U.S. Application Data

(63) Continuation-in-part of application No. 10/956,523, filed on Sep. 22, 2004, now Pat. No. 7,075,457.

(51) Int. Cl.
*G01C 21/00* (2006.01)

(52) U.S. Cl. ...................... 340/971; 340/945; 340/972; 340/973; 701/4

(58) Field of Classification Search ................ 340/971, 340/963, 967, 969, 972, 973, 977, 979, 945; 701/3, 4
See application file for complete search history.

(56) References Cited

U.S. PATENT DOCUMENTS

| | | | | |
|---|---|---|---|---|
| 5,915,273 | A * | 6/1999 | Germanetti | 73/178 H |
| 6,985,091 | B1 * | 1/2006 | Price | 340/975 |

* cited by examiner

*Primary Examiner*—Davetta W. Goins
(74) *Attorney, Agent, or Firm*—John F. Schipper; Robert M. Padilla

(57) ABSTRACT

Method and system for analyzing and displaying one or more present flight parameter values FP(t) of an aircraft in motion at a measurement time $t_n$, and for comparing the present flight parameter value with a selected percentage band, containing historical flight parameter data for similar conditions.

14 Claims, 7 Drawing Sheets

Flight Parameter= ____________________

Time: $t = t_n$ ____________________

FP ($t_n$;meas) = ____________________

FP ($t_n$;hist;m)= ____________________

Statistical percentage for FP value = ____________________

Possible source(s) of a typicality = ____________________

Recommended corrective action(s), if any:

____________________

____________________

____________________

____________________

FIG. 8

HISTORICAL ANALYSIS OF AIRCRAFT FLIGHT PARAMETERS

CROSS REFERENCE TO RELATED APPLICATIONS

This application is a Continuation In Part of U.S. Ser. No. 10/956,523, filed 22 Sep. 2004 now U.S. Pat. No. 7,075,457.

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to monitoring, analysis and graphic illustration of historical energy, location and orientation parameters for an aircraft in various phases of a flight.

BACKGROUND OF THE INVENTION

An aircraft that is ascending following takeoff or descending on approach will have measurable kinetic energy and potential energy components, and these components will change with time in measurable, if not predictable, manners. Desirable energy states for both takeoff and landing can be determined from aircraft manufacturer guidance for these phases of flight. For example, where the approach occurs at an airport with an operable and reliable instrument landing system (ILS), the ILS system may provide data recorded on the aircraft to serve as a standard for comparing observed kinetic and potential energy components for an aircraft near the ground, below 2500 feet altitude and for an assumed straight path to a touchdown site. If the airport has no operable and reliable ILS, or if the aircraft is not near the ground, another mechanism for providing a standard for measurements or estimates is needed. On takeoff, where no electronic guidance comparable to the glideslope is available, the aircraft climb profile can be compared to manufacturer guidance or to observed performance for recorded aircraft departures from the particular airport.

The airline industry has become concerned with the problem of unstable aircraft approaches, because approach and landing accidents often begin as unstable approaches. An "unstable approach" is often defined as an approach where below a threshold altitude (1000 feet for IFR and 500 feet for VFR), the aircraft is not established on a proper glide path and with a proper air speed, with a stable descent rate and engine power setting, and with a proper landing configuration (landing gear and flaps extended). Airlines have developed approach procedures that call for abandonment of an approach that is determined to be unstable.

Development and testing of methods for detecting atypical flights by N.A.S.A. has revealed that high energy during an arrival phase (below 10,000 feet but before beginning an approach) is the most common reason for a flight to be identified as atypical or out of a statistically normal range. An atypical high energy arrival phase often corresponds to aircraft kinetic energy and/or potential energy that requires dissipation of 10–30 percent more energy than is required for a reference arrival phase. A reference arrival phase may correspond to about a 3 miles per 1000 feet elevation change ("3-to-1") glide path slope and decelerating to an airspeed of about 250 knots during descent through 10,000 feet altitude to a standard reference speed around 2,500 feet altitude, when beginning an approach.

More than half of the high energy arrivals identified by atypicality analysis were brought under control within stabilized approach criteria; some of the remainder of the high energy arrivals were abandoned. In contrast, where these findings were used to define and search for a high-energy arrival exceedance, about three times as many excedances were detected; and the resulting unstable approaches were found to occur more frequently than the recoveries.

It may be possible to identify, by historical analysis, a first class of high energy arrivals where recovery and subsequent stabilization is possible and relatively easy, and a second class of high energy arrivals in which recovery and subsequent stabilization is likely to be difficult or impossible. However, the present procedures for determining presence of a reference (acceptable) approach include an electronic glide slope that extends linearly from the end of a target runway to the aircraft, whereas a reference aircraft approach path is curved and follows the electronic glide slope only from about 1,800 feet above the field to the end of the runway.

A 3-to-1 glide path slope, corresponding to decrease of 1,000 feet in altitude for every 3 nautical miles horizontal travel, is often desirable during an arrival phase. Air speed is 250 knots or less by regulation below 10,000 feet, and the aircraft decelerates to a lower reference speed before joining the approach path. These parameters are directly available but are unlikely to prove to be the only relevant parameters in determining whether a flight arrival phase is normal or other than normal.

When an energy component value or orientation component value for a completed flight of interest (referred to herein as a "target flight") has been measured or observed and compared with a corresponding value for a reference flight, this information should be displayed for possible remedial action on a subsequent flight. A flight operator may also benefit from a display of one or more predictions, based upon the observed or measured target FP values, of the behavior of this FP value over a short time interval extending into the future.

What is needed is a system for displaying energy and other flight parameters associated with one or more phases of target flight, which permits historical analysis and visual and/or alphanumeric comparison of the target FP values with corresponding reference FP values for other flights. Preferably, the system should provide corresponding variables for a reference flight, for comparison with the target flight, and should provide a band surrounding of reference FP values that indicates values of that FP that are acceptable in executing a particular maneuver and ranges of values of that FP from which recovery to a reference flight configuration is unlikely or substantially impossible. Preferably, a difference between the target FP value and the reference FP value, and one or more time derivatives of this difference should be displayed and are used to predict values of this difference over a short time interval in the future.

SUMMARY OF THE INVENTION

These needs are met by the invention, which provides a method and system for displaying time variation of one or more flight parameter values, including but not limited to total energy, kinetic energy, potential energy, applied power, vertical speed, height above ground, relevant drag indices and angle of attack for an aircraft in motion and for variation with time of any of these variables with one or more of approximately 20 primary parameters that arise in an energy configuration analysis of the aircraft. More particularly, the system can compare selected variables for the target flight with corresponding variables for a reference flight in a selected flight phase (e.g., approach to touchdown or take-off). Optionally, the system displays target flight parameter values and indicates what actions might have been taken during the flight to bring the target flight parameter values within a percentage band of historical data for the flight parameter(s). A display of a flight parameter value may be graphical, alphanumeric, or a combination of graphical and alphanumeric.

The system displays a percentage band PB including a selected percentage value p, in a range such as $70\% \leqq p \leqq 95\%$ of all historic data for a given flight parameter for a similar environment. The system also measures (or estimates) and displays a target FP value for a flight of interest under similar environmental conditions, for comparison. Optionally, when the target FP value lies outside the PB, the system performs a further analysis to identify what anomalies are sources of these conditions.

In one embodiment, the system measures and analyzes relevant parameter values for an ascending or descending aircraft to determine if an energy and/or orientation FP value of the target flight is within, or is outside of, a range for a normal flight. This invention can be used in post-flight review of flight data and/or as part of a flight operations quality assurance program to alert an analyst to presence of an anomalous or atypical energy state in historical data.

This measurement/estimation/analysis process may include the following:

(i) providing an estimate or measurement of a target flight parameter value $FP(t_n)$ (referred to as a "measured target FP value") of an aircraft flight parameter during a selected phase (e.g., takeoff, ascent, descent or approach) of a flight, at each of a sequence of measurement (or estimation) times $t_n$ ($n=1, \ldots, N$; $N \geqq 2$);

(ii) providing and displaying a percentage band ("PB") of historical data $FP(t_n;hist;m)$ ($m=1, \ldots, M$; $M \geqq 2$) for the flight parameter of interest, drawn from historical FP values for M flights under similar conditions;

(iii) determining if the target FP value for the measurement time $t_n$ lies within the PB;

(iv) when the target FP value does not lie within the PB, visually or aurally indicating this, and optionally recommending at least one action that may begin to bring subsequently received FP values for the target flight within the PB for future measurement times $t_n$; and (v) when the target FP value lies within the PB, optionally displaying this value and the band for the measurement time $t_n$.

Flight parameters that can be monitored, analyzed and/or displayed using this approach include: kinetic energy $KE(t)=m(t)\cdot v(t)^2/2+\omega\cdot I\cdot\omega/2$; potential energy $PE(t)=m(t)\cdot g\cdot h(t)$; energy component $E(t)=d\mathbf{1}\cdot KE(t)+d\mathbf{2}\cdot PE(t)$, where $(d\mathbf{1},d\mathbf{2})$ are selected non-negative real numbers; energy component time derivative $(d/dt)E(t)$, thrust power, vertical speed, ground air speed, aircraft mass, height above ground, flap position, speed brake position, landing gear position, other drag indices, roll, pitch and/or yaw angles; and angle of attack.

BRIEF DESCRIPTION OF THE DRAWINGS

FIGS. 7 and 8 are a flow chart and accompanying screen for practicing an embodiment of the invention.

DESCRIPTION OF BEST MODES OF THE INVENTION

Figure 1A:
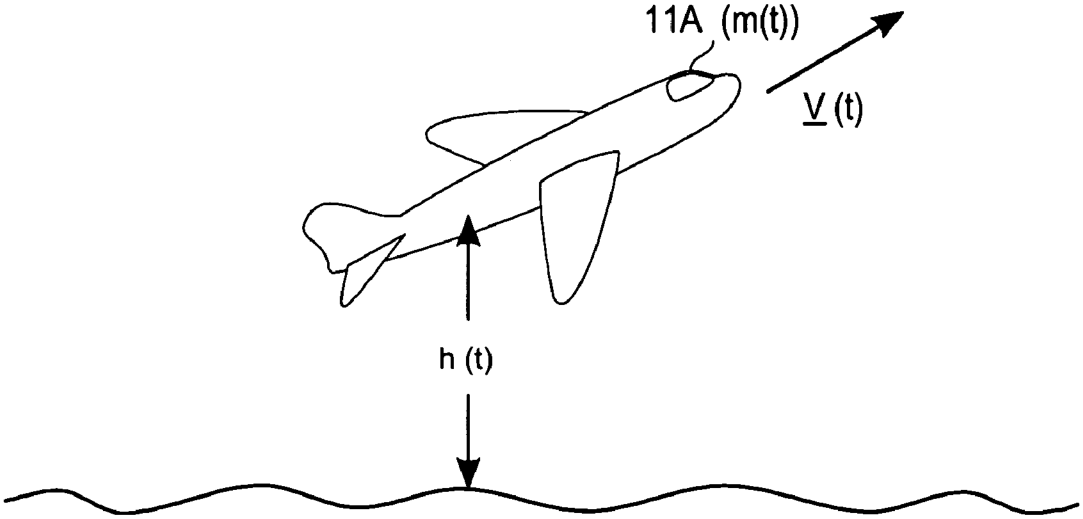
FIGS. 1A and 1B illustrate environments in which the invention can be practiced.
Figure 1B:
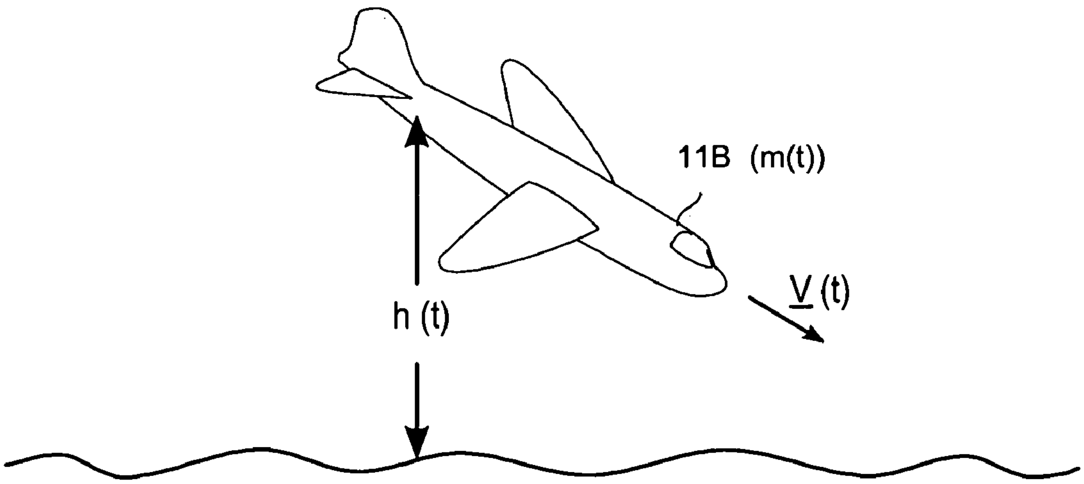

FIGS. 1A and 1B illustrate environments for an ascending aircraft (1A) and for a descending aircraft (1B) where the invention can be practiced. In FIG. 1A, an aircraft 11A is ascending, either after takeoff or in moving from a first flight altitude to a second flight altitude. The aircraft has at least one of an associated kinetic energy component $KE(t_n)$ and/o associated potential energy component $PE(t_n)$, measured or estimated or otherwise provided, at each of a first sequence $\{t_n\}n$ of two or more time values, thrust power, vertical speed, height above ground, individual or collective drag indices, roll angle, pitch angle, yaw angle and angle of attack. The aircraft kinetic energy and potential energy components for a target flight are, respectively, $$KE(t)=m(t)\cdot v(t)^2/2+\omega(\tau)\cdot I(t)\cdot\omega(t)/2, \quad (1)$$

$$PE(t)=m(t)\cdot g\cdot\cdot h(t), \quad (2)$$

where m(t) is the instantaneous aircraft mass (taking account of fuel consumption), I(t) is an instantaneous moment of inertia tensor for the aircraft, o(t) is an aircraft rotation vector, computed with reference to a center of gravity or other selected location determined with reference to the aircraft (optional), v(t)=dx/dt is the instantaneous aircraft velocity and h(t) is the instantaneous height of aircraft cg above local reference height, such as local ground height. The rotational component of kinetic energy may be negligible or may be ignored for other reasonsFor an approach to touchdown, the flight parameter of greatest concern is often kinetic energy KE(t).

Figure 2:
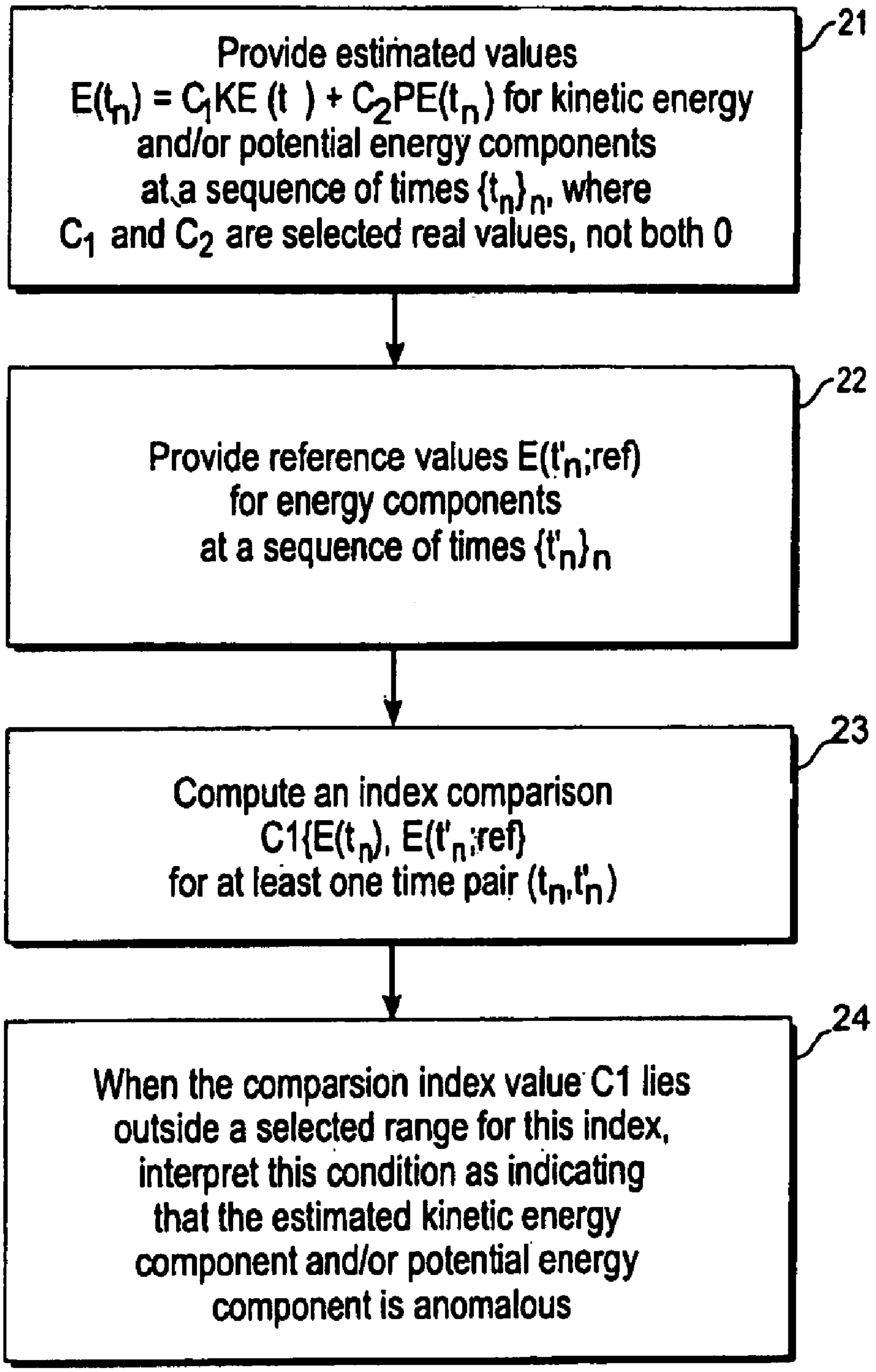
FIGS. 2 and 3 are flow charts of procedures for analyzing aircraft energy components according to the invention.

FIG. 2 is a flow chart of a procedure for practicing an embodiment of the invention. In step 21, an aircraft system measures or estimates or otherwise provides a value (referred to as an "measured value" for convenience herein)

$$E(t_n)=d1\cdot KE(t_n)+d2\cdot PE(t_n) \quad (3)$$

of an energy component of an aircraft during an ascent phase or descent phase of a target flight, at each of a first sequence of times ($n=1, \ldots, N1$; $N1 \geqq 2$), where d1 and d2 are selected real values, not both 0. In step 22, the system provides or computes a reference value $E(t'_n;ref)$ of the energy component at a time, $t=t'_n$, determined with reference to the time $t_n$ ($n=1, \ldots, N1$). The time sequence $\{t'_n\}$ may substantially coincide with the sequence $\{t_n\}$, or each time value $t'_n$ may be displaced by a calculable or measurable amount from the corresponding time value $t_n$. In step 23, the system computes an index of comparison value C1$\{E(t_n), E(t'_n;ref)\}$ of the measured and reference energy components for at least one time value pair $(t_n,t'_n)$. When the comparison index value C1 lies outside a selected range for this index, the system interprets this condition as indicating that the measured energy component is anomalous or non-normal or may lead to an unstable aircraft maneuver, in step 24.

A variety of comparison indices C1 can be used here. Some examples are: (1) a first ratio $E(t_n)/E(t'_n;ref)$; (2) a second ratio $E(t'_n;ref)/E(t_n)$; (3) a difference $E(t_n)-E(t'_n;ref)\}$; (4) an absolute difference $|E(t_n)-E(t'_n;ref)|$; (5) a normalized difference $\{E(t_n)-E(t'_n;ref)\}/\{a-E(t_n)+(1-a)\cdot E(t'_n;ref)\}$, where a is a selected real value in a range $0\leqq a\leqq 1$; (6) a weighted average of the differences $KE(t_n)-KE(t'_n;ref)$ and/or $PE(t_n)-PE(t'_n;ref)$, such as $$WA=\sum_{n=1}^{N1} w_n\{|KE(t_n)-KE(t'_n;ref)|^p+|PE(t_n)-PE(t'_n;ref)|^p\}^{1/p}, \quad (4)$$

where p is a selected positive number (e.g., p=1 or 2 or 3.14) and $\{w_n\}_n$ is a sequence of weight values (preferably, but not necessarily, non-negative); and (7) a monotonic function of one or more of the preceding combinations.

The comparison index C1 may use two or more point values, $E(t_n)$ and $E(t'_n;ref)$, or may use a weighted average of these values, such as the average $$WA1=\sum_{n=1}^{N1} w_n C1\{E(t_n), E(t'_n;ref)\}. \quad (5)$$

The analysis may be extended to consider time rates of change, (d/dt)KE(t) and/or (d/dt)PE(t), of the kinetic and/or potential energy components at a sequence of one or more times $\{t_n\}_n$ (n=1, . . . , N2; $N2\geqq 1$), plus corresponding reference time rates of change, (d/dt)E(t;ref), at a sequence of times $\{t'_n\}_n$ determined with reference to the time sequence $\{t_n\}_n$. Another comparison index, $C2\{(d/dt)E(t_n), (d/dt)E(t'_n;ref)\}$, which may be the same or different from the comparison index C1, is computed and compared with a second selected range to determine if the aircraft flight is anomalous or non-normal or is within a normal range. Again, the comparison index C2 may use point values or a weighted average of the values (d/dt)E(t) and/or (d/dt)E(t;ref).

Figure 3:
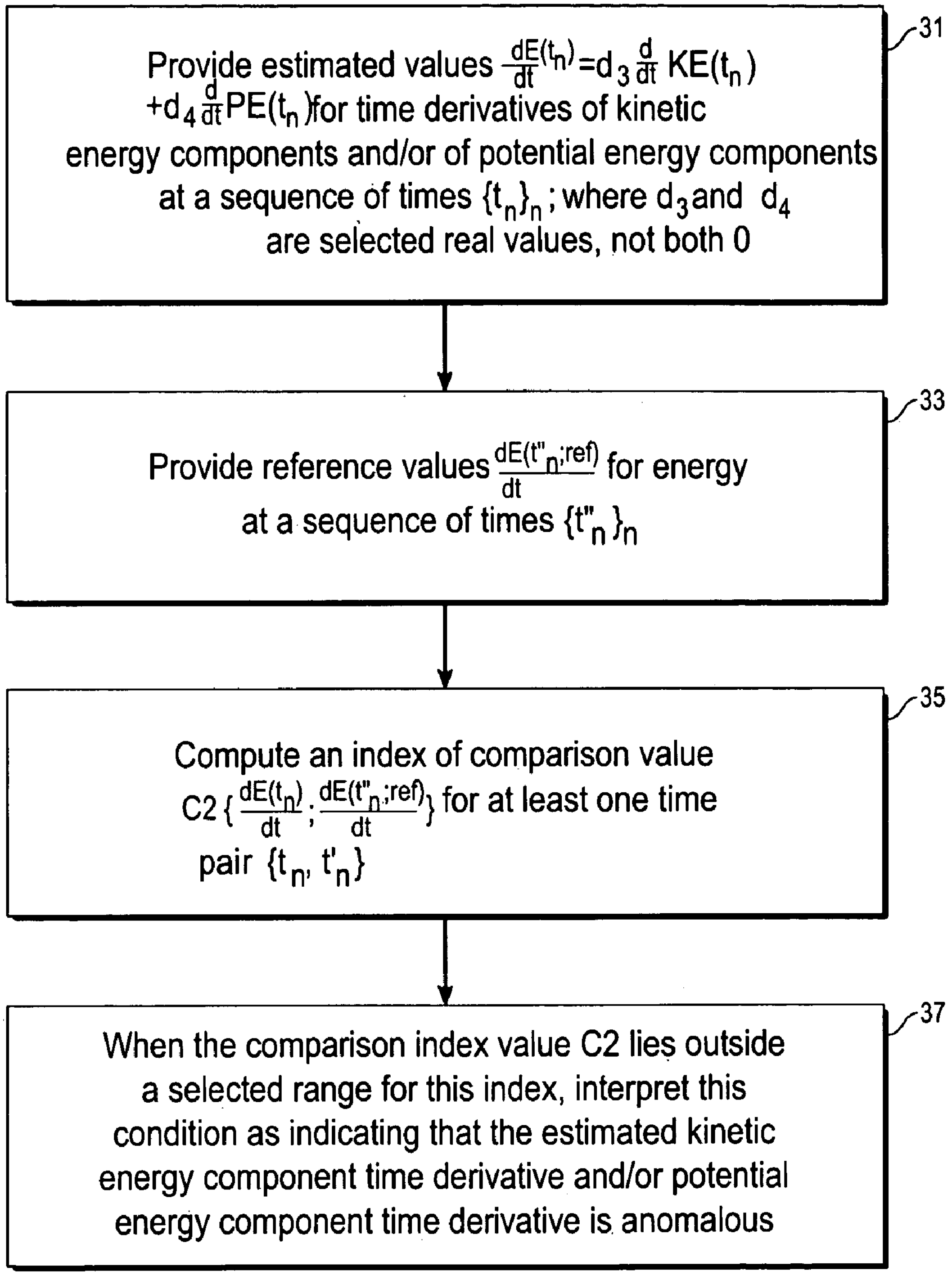

FIG. 3 is a flow chart of another procedure for practicing an embodiment using time derivatives of the energy component $E(t_n)$. In step 31, an aircraft system measures or estimates or otherwise provides an "estimated value", $(d/dt)E(t_n)=d3\cdot(d/dt)KE(t_n)+d4\cdot(d/dt)PE(t_n)$ of an energy component of an aircraft during an ascent phase or descent phase of a target flight, at each of a first sequence of times (n=1, . . . , N1; $N1\geqq 2$), where d3 and d4 are selected real values, not both 0. In step 32, the system provides or computes a reference value $(d/dt)E(t'_n;ref)$ of the energy component at a time, $t=t'_n$, determined with reference to the time $t_n$ (n=1, . . . , N1). The time sequence $\{t''_n\}$ may substantially coincide with the sequence $\{t_n\}$ or $\{t'_n\}_n$, or each time value $t''_n$ may be displaced by a calculable or measurable amount from the corresponding time value $t_n$. In step 33, the system computes an index of comparison value $C2\{(d/dt)E(t_n), (d/dt)E(t'_n;ref)\}$ of the estimated and reference energy component time derivatives for at least one time value pair $(t_n,t''_n)$. When the comparison index value C2 lies outside a selected range for this index, the system interprets this condition as indicating that the estimated energy component time derivative is anomalous or non-normal or would lead to an unstable aircraft maneuver, in step 34.

The analysis may be further extended to consider a third comparison index, $C3\{E(t_n), E(t'_n;ref), (d/dt)E(t_n), (d/dt)E(t''_n;ref)\}$, that depends upon some or all of the estimated values and time rates of change of the estimated values of the energy components. Again, the comparison index C3 may use point values or a weighted average of the values E(t) and/or E(t;ref) and/or (d/dt)E(t)/dt and/or (d/dt)E(t;ref).

A formulation of, and use of, the equations of motion of a target aircraft flight, including the effects of gravity, variable wind speeds, drag and lift forces on various control surfaces, variation of aircraft mass due to fuel consumption, and variable thrust, is set forth in an Appendix. A thrust vector is determined, as a function of the location coordinates, that will move the aircraft from an initial velocity vector $v_0(x_0,y_0,z_0)$ to a desired final velocity vector $v_f(x_f,y_f,z_f)$ as part of a takeoff phase or as part of an approach phase for a flight. The aircraft kinetic energy is a sum as in Eq. (1).

Figure 4:
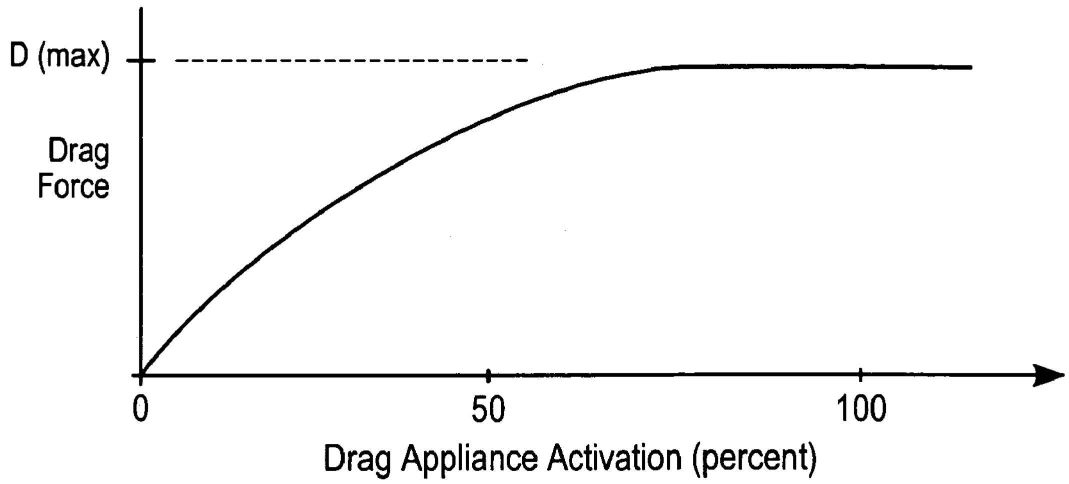
FIG. 4 graphically illustrates variation of drag force with drag appliance activation.

Each aircraft has an associated group of drag indices, one for each activatable drag appliance (landing gear, wing flap, spoiler/speed brake, etc.). Each drag index has a maximum value where the drag appliance is fully activated and has a spectrum of drag values extending from zero activation through partial activation to full activation of the appliance, as illustrated schematically in FIG. 4. With the drag appliance completely inactivated, the corresponding drag index is normally 0. The drag force associated with one drag appliance is assumed to be independent of the drag force associated with another drag appliance, in a first approximation. In an approach to landing, for example, where a relatively small amount of additional drag force is required for fine adjustment, one or more drag appliances can be partly or fully activated to provide this additional drag force, relying on information illustrated in FIG. 4 for each drag appliance. If the amount of additional drag force needed for the adjustment is greater than the maximum drag force associated with all the activated drag appliances, the aircraft would need to use additional procedures to provide the additional drag force, or the target flight configuration should be (or should have been) terminated and reconfigured. In practice, some drag appliances, such as landing gear, are normally inactivated or fully activated, while other drag appliances, such as a speed brake, have a near-continuous range of settings. The sum of the drag indices for all (activated) drag appliances is determined and provided s a supplement to the drag force(s) provided by the other aircraft components.

Monitoring of thrust power developed by the engine(s) of the aircraft is straightforward and is an important control variable in change of the energy component E(t) defined in Eq. (3). Thrust developed can be estimated using measured fuel flow rate, temperature within the engine(s) and other relevant variables.

Aircraft angle of attack can be measured, made available and recorded on the aircraft.

Figure 5:
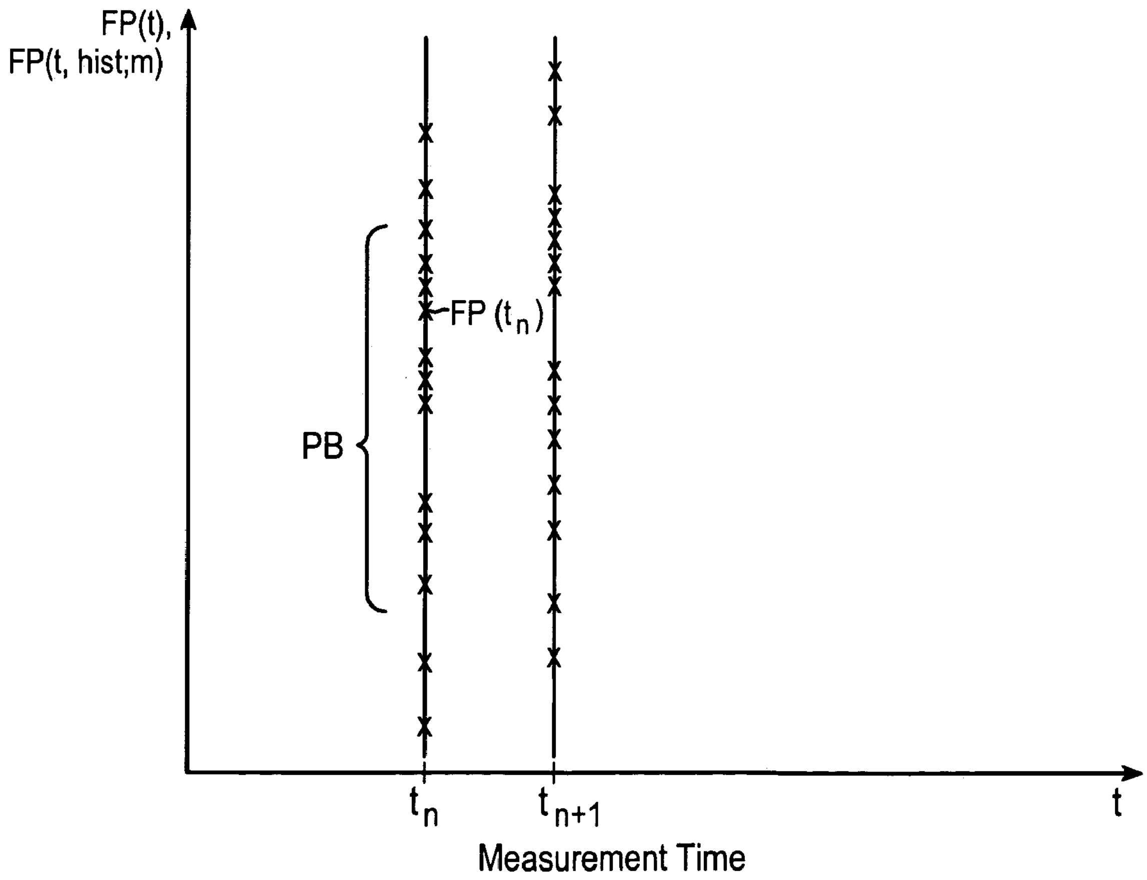
FIG. 5 illustrates a display screen that incorporate the invention.

FIG. 5 is a characterization of a sequence of measured values for a flight parameter FP(t) of interest over a selected time interval, for the target flight, and for historical data from a collection of preceding flights under similar conditions, denoted FP(t;hist;m) for M preceding flights (m=1, . . . , M; $M\geqq 2$). The time t is referenced to a sequence of measurement times $t_n$, corresponding to a reference time, such as the time before lift-off, the time since lift-off, the time since passing a specified waypoint, or the time preceding touchdown of the aircraft. For any measurement time $t_n$, the historical data $FP(t_n;hist;m)$ provide a spectrum of FP values, as illustrated in FIG. 5, which can be arranged from lowest to highest as shown. A percentage band PB of consecutive FP values (from lowest to highest, or from highest to lowest) for a corresponding measurement time $t_n$ is specified, corresponding to a selected percentage in a range, such as 70%≦p≦95%, and the collection of FP values in this band is used as a standard against which the target FP value FP(t) is compared. For example, the percentage band PB may be all values FP(tn;hist;m) in (1) the lowest p percent, (2) the highest p percent; (3) a symmetric band, centered at the median value; or (4) a band having the lowest max-min difference, FP(max)−FP(min), for all values in the band.

The flight parameter value FP($t_n$) for the target flight is then compared with values FP($t_n$;hist;m) in the band PB, as illustrated in FIG. 5, to determine if the target FP configuration is within a normal or typical range of the historical FP data for the time t=$t_n$. Where the target FP value lies outside the percentage band PB, this target FP value is optionally interpreted as atypical or non-normal, and a recommendation for specified action is optionally provided to bring this target FP value within a typical range. A target FP value may lie in a normal range for a first sequence of measurement times $t_n$ and may lie in an atypical range in a second sequence of measurement times $t_n$. The PB may be characterized by upper and lower traces representing maximum and minimum FP values within the band, as shown in FIG. 5, or another FP display scheme may be used. Whatever characterization of the PB is used, the target FP values FP($t_n$) for each relevant measurement time $t_n$ are explicitly displayed on the same graph for monitoring by the aircraft operator.

Where the target FP value FP($t_n$) lies substantially outside the percentage band PB for that measurement time, the system optionally performs a further analysis to (i) indicate presence of an atypical or anomalous FP value; (ii) estimate a percentage band (e.g., highest or lowest 1.5 percent in the statistical polulation of values for that FP) in which the FP value falls; and/or (iii) identify one or more sources of the anomalous value.

For example, where the kinetic energy of the target aircraft on approach was too large relative to the FP values within the PB, indicating that the approach velocity was too large, the system may identify a kinetic energy value for a preceding waypoint or for a preceding altitude during descent that was much higher than an acceptable value. These recommendations are made for an already-completed flight but may be useful in comparing similarly atypical target flights that are completed.

Figure 6:
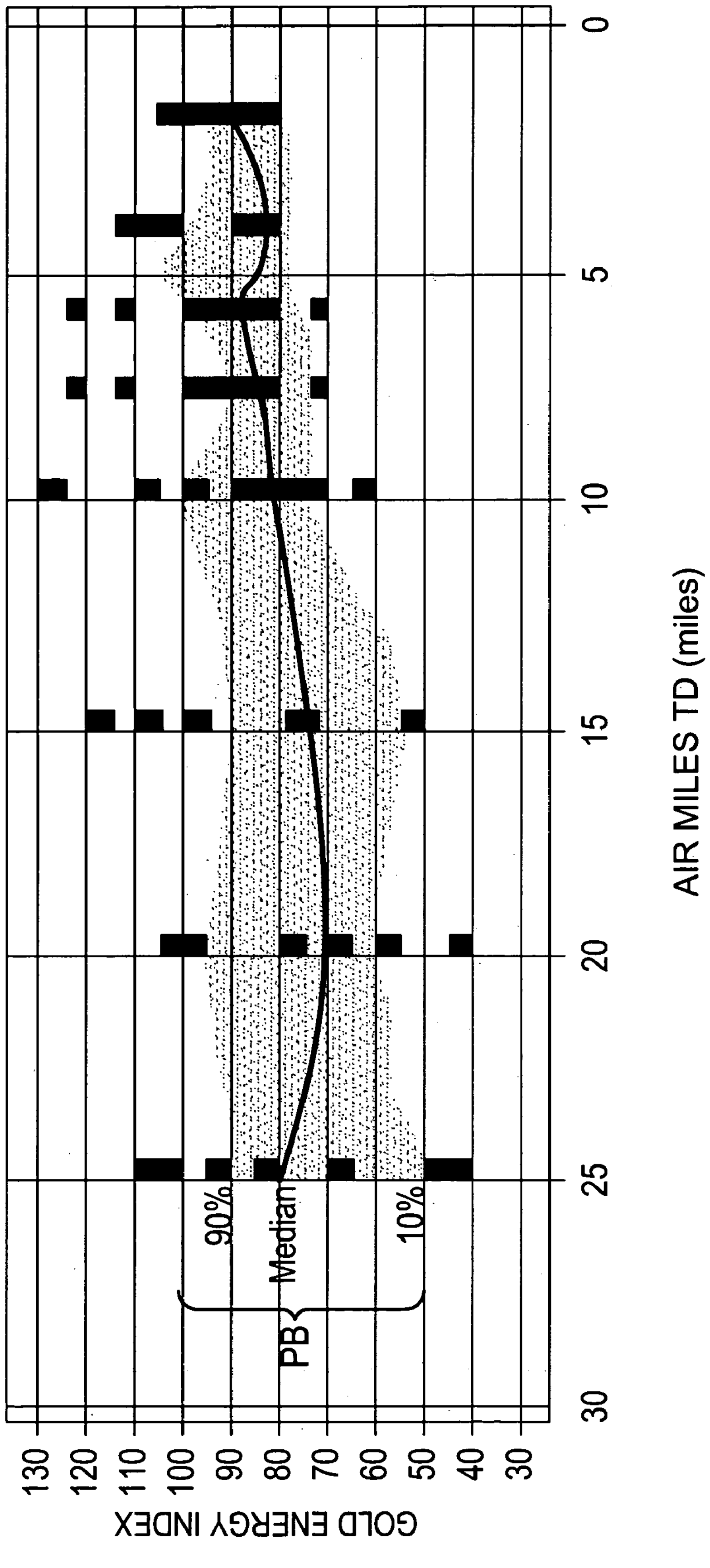
FIG. 6 illustrates variation of a percentage band for energy with air miles to touchdown.

FIG. 6 illustrates variation with air miles to touchdown of a percentage band and median value for an energy index for a normal or reference flight. Note that the PB width decreases steadily as touchdown is approached.

Figure 7:
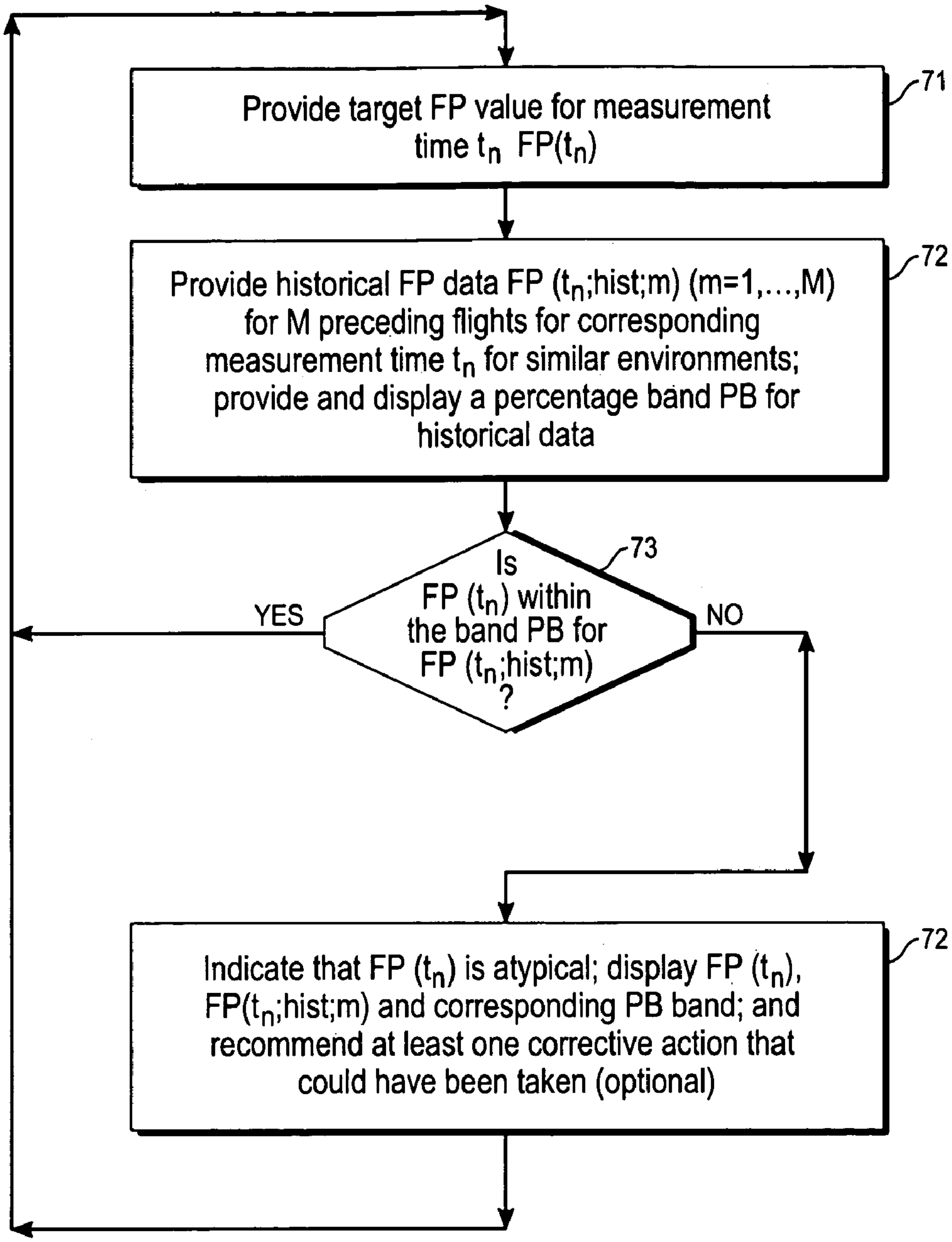

FIG. 7 is a flow chart of a procedure for practicing the invention. In step 71, the system receives or otherwise provides a target FP value, measured or otherwise provided, for a measurement time $t_n$. In step 72, the system provides and optionally displays historical data FP($t_n$;hist;m) (m=1, . . . , M) for M preceding flights under similar conditions for the FP of interest, displays the target FP value and the percentage band PB for the historical FP data corresponding to the time $t_n$. Optionally, the system displays one or more target FP values received (at measurement times $t_{n'}$, <$t_n$) before the target FP value was received and the corresponding PB for these previously received FP values. In step 73, the system determines if the target FP value is within the PB for the corresponding time $t_n$. If the answer to the query in step 73 is "yes," the system takes no further action and returns to step 71. If the answer to the query in step 73 is "no," the system indicates, in step 74, that the target FP value is atypical, displays FP($t_n$) and FP($t_n$;hist;m), returns to step 71, and optionally recommends at least one corrective action, if any, that could have been taken to bring the subsequently received target FP values within the PB for at least one future measurement time.

FIG. 8 illustrates a screen that may be used in connection with step 74 of FIG. 7, displaying one or more of: the flight parameter, the measurement time $t_n$, the presently measured FP value FP($t_n$;meas), a corresponding historical (ideal or reference) FP value FP($t_n$;hist;m) for a preceding flight number m (=1, . . . , M) under similar conditions, an estimated statistical percentage associated with the atypical FP value, a possible source(s) of the atypicality, and a recommended corrective action, if any (optional).

What is claimed is:

1. A method of displaying flight parameters of an aircraft in flight, the method comprising:

providing an estimate or measurement of a value (referred to as an "estimated value") of a present flight parameter value, FP($t_n$) for an aircraft during a selected phase of a flight, at each of a first sequence of times, t=$t_n$ (n=1, . . . , N; N≧2), providing and displaying a percentage band of historical data FP($t_n$;hist;m) (m=1, . . . , M; M≧2) for the flight parameter of interest, drawn from FP values for M flights under similar conditions and including no more than a selected percentage p of the M flights, with p<100 percent;

determining if the present FP value for the measurement time $t_n$ lies within the percentage band; and when the present FP value does not lie within the percentage band, displaying the present FP value and the percentage band for the measurement time $t_n$ in at least one of a visually perceptible and an audibly perceptible manner.

2. The method of claim 1, further comprising:

when said present FP value does not lie within said percentage band, taking at least one of the following actions: (i) acknowledging that said present FP value is atypical or anomalous; (ii) providing an estimate of a statistical percentage, among a population of values, corresponding to said present FP value; and (iii) identifying at least one source of said atypical present FP value.

3. The method of claim 1, further comprising:

when said present FP value lies within said percentage band displaying said present value and said percentage band for said measurement time $t_n$.

4. The method of claim 1, further comprising choosing said percentage band to include a consecutively, monotonically increasing group of values FP($t_n$;hist;m) for said time $t_n$.

5. The method of claim 4, further comprising choosing said selected percentage p in a range 70 percent<p<95 percent.

6. The method of claim 1, further comprising selecting said percentage p from the following group: (1) the lowest p percent, (2) the highest p percent; (3) a symmetric band, centered at the median value; or (4) a band having the lowest max-min difference, FP(max)−FP(min), for all values in the band.

7. The method of claim 1, further comprising choosing said flight parameter value from the group of flight parameter values consisting of: an energy component, E($t_n$)=d1·KE($t_n$)+d2·PE($t_n$), of a combination of a kinetic energy component KE($t_n$) and a potential energy component PE($t_n$) of said aircraft, where d1 and d2 are selected real values, not both 0; an estimated value (d/dt)E($t_n$)=d3·(d/dt) KE($t_n$)+d4·(d/dt)PE($t_n$) of a time rate of change of said estimated energy component, where d3 and d4 are selected real values, not both 0; thrust power applied to said aircraft; weight of said aircraft; flap position for said aircraft; speed brake position for said aircraft; a selected drag index for at least one drag appliance for said aircraft; air speed of said aircraft; vertical speed of said aircraft; height of said aircraft above a local reference height; roll angle of said aircraft; pitch angle of said aircraft; yaw angle of sad aircraft; and angle of attack of said aircraft.

8. A system of displaying flight parameters of an aircraft in flight, the system comprising a computer that is programmed:

to provide an estimate or measurement of a value (referred to as an "estimated value") of a present flight parameter value, $FP(t_n)$ for an aircraft during a selected phase of a flight, at each of a first sequence of times, $t=t_n$ (n=1, . . . , N; N≧2), to provide and display a percentage band of historical data $FP(t_n;hist;m)$ (m=1, . . . , M; M≧2) for the flight parameter of interest, drawn from FP values for M flights under similar conditions and including no more than a selected percentage p of the M flights, with p<100 percent;

to determine if the present FP value for the measurement time $t_n$ lies within the percentage band; and when the present FP value does not lie within the percentage band, to display the present FP value and the percentage band for the measurement time $t_n$ in at least one of a visually perceptible and an audibly perceptible manner.

9. The system of claim 8, wherein said computer is further programmed so that:

when said present FP value does not lie within said percentage band, performinmg at least one of the following actions: (i) acknowledging that said present FP value is atypical or anomalous; (ii) providing an estimate of a statistical percentage, among a population of values, corresponding to said present FP value; and (iii) identifying at least one source of said atypical present FP value.

10. The system of claim 8, wherein said computer is further programmed so that:

when said present FP value lies within said percentage band to display said present value and said percentage band for said measurement time $t_n$.

11. The system of claim 8, wherein said computer is further programmed to choose said percentage band to include a selected percentage of said historical data, where the selected percentage includes a consecutively, monotonically increasing group of values $FP(t_n;hist;m)$ for said time $t_n$.

12. The system of claim 8, wherein said computer is further programmed to choose said selected p in a range 70 percent<p<95 percent.

13. The system of claim 8, wherein said computer is further programmed to select said percentage p from the following group: (1) the lowest p percent, (2) the highest p percent; (3) a symmetric band, centered at the median value; or (4) a band having the lowest max-min difference, FP(max)−FP(min), for all values in the band.

14. The system of claim 8, wherein said computer is further programmed to choose said flight parameter value from the group of flight parameter values consisting of: an energy component, $E(t_n)=d\mathbf{1}\cdot KE(t_n)+d\mathbf{2}\cdot PE(t_n)$, of a combination of a kinetic energy component $KE(t_n)$ and a potential energy component $PE(t_n)$ of said aircraft, where d1 and d2 are selected real values, not both 0; an estimated value $(d/dt)E(t_n)=d\mathbf{3}\cdot(d/dt)KE(t_n)+d\mathbf{4}\cdot(d/dt)PE(t_n)$ of a time rate of change of said estimated energy component, where d3 and d4 are selected real values, not both 0; thrust power applied to said aircraft; weight of said aircraft; flap position for said aircraft; speed brake position for said aircraft; a selected drag index for at least one drag appliance for said aircraft; air speed of said aircraft; vertical speed of said aircraft; height of said aircraft above a local reference height; roll angle of said aircraft; pitch angle of said aircraft; yaw angle of sad aircraft; and angle of attack of said aircraft.

* * * * *